Charles E. David
Hollis W. O'Mary,
INVENTORS.
BY Harry M. Saragovitz
Edward J. Kelly
Herbert Berl
Aubrey J. Dunn March 4, 1969 C. E. DAVID ET AL 3,431,501

SOLID STATE INTERPOLATOR

Filed Jan. 3, 1966 Sheet 2 of 2

Charles E. David
Hollis W. O'Mary,
INVENTORS.

Harry M. Saragovitz
BY Edward J. Kelly
Herbert Berl
Aubrey J. Dunn

United States Patent Office 3,431,501
Patented Mar. 4, 1969

3,431,501
SOLID STATE INTERPOLATOR

Charles E. David and Hollis W. O'Mary, Huntsville, Ala., assignors to the United States of America as represented by the Secretary of the Army Filed Jan. 3, 1966, Ser. No. 518,491
U.S. Cl. 328—161 8 Claims
Int. Cl. G06g 7/16

The invention described herein may be manufactured and used by for the Government for governmental purpose without the payment of any royalty thereon.

This invention relates to a solid state interpolator for use in a Doppler radar return processing network.

The invention is an improvement over the known type of interpolators, such as that described in the article, "A Sequential Detection System for the Processing of Radar Returns," by Aaron A. Galvin, Proceedings of the IRE, 1961, pages 1419 and 1420.

Early attempts at implementing this type of interpolator encountered the following problems. Referring to FIGURE 10 on page 1420 of the above article.

(1) The long time-constant peak detectors were required to hold the analog input levels until the "greatest of" comparator determined which input was greatest and until the interpolator finished its interpolation. This long processing time required a very high value of load impedance for the peak detectors.

(2) Tube type operational amplifiers that were used in the integrator ($\int dt$), did not permit high speed processing of the signal.

(3) The long processing time required additional interpolators to process other targets.

The invention overcomes the above problems in the following manner.

(1) It utilizes a high speed intergrator which permits the interpolation to be accomplished in a 100 $\mu$sec. or less.

(2) The high speed signal processing technique only feeds A and B inputs to the interpolator.

(3) The high input impedance-low output impedance characteristics of field effect transistors are utilized in the peak detector circuits. These features, along with shorter signal processing times, permit the use of solid state devices.

(4) A simple RC intergrator is used to permit the high speed interpolation.

(5) The interpolator of the invention utilizes solid state devices throughout.

(6) The short processing time permits the interpolator to be used for several targets, thereby reducing the number required for a system.

The high speed interpolator of the invention could be utilized most effectively in modern radar systems that are required to process several targets simultaneously.

This device differs from previous devices in its field by the addition of field effect transistors for high impedance peak hold circuits. This device can be used in radar systems, data processors, and special purpose computers. The advantage of this device is the high input impedance gained by the use of field effect transistors. This allows control of the size of the charging capacitor, and control of the holding time.

A special low output impedance driving circuit is not required for this interpolator. It allows a choice of interpolating time based on other considerations than the interpolating device and makes possible a completely solid state interpolator.

The invention is a data processor that receives two input pulses with a third pulse produced at its output. The time interval between the input pulses and the output pulse is approximately proportional to the ratio of the amplitude of one of the input pulses to the amplitude of the sum of the input pulses.

The invention may be best understood by reference to the drawings, in which.

Figure 1:
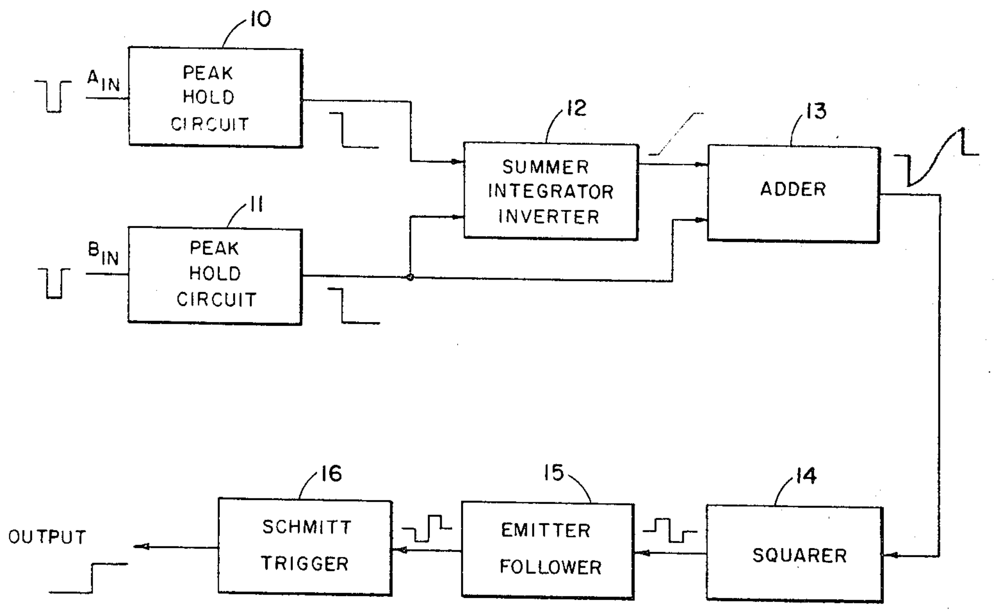
FIGURE 1 shows a block diagram of the interpolator.

References 10 and 11 denominate peak hold circuits. They receive pulses such as $A_{in}$ or $B_{in}$ and produce outputs constant at the peak of the input pulses during the interpolating interval. Circuit 12 receives two step inputs from hold circuits 10 and 11. The output of circuit 12 rises exponentially to the negative of the sum of the two inputs during the interpolating interval. Adder 13 adds the integrated output of circuit 12 to the step output of peak hold circuit 11. Squaring circuit 14 squares the input from adder 13, causing a steep slope zero crossing. Emitter follower 15 is a buffer stage between squarer 14 and a Schmitt trigger 16. The Schmitt trigger is a zero crossing detector. The output of Schmitt trigger 16 is a negative step at the zero crossing point in time.

Operation of the invention is as follows: Two input pulses $A_{in}$ and $B_{in}$ are received at the inputs of the peak hold circuits 10 and 11. The peak hold circuits hold the peak amplitudes of $A_{in}$ and $B_{in}$ until the cycle is complete. The outputs of peak hold circuits 10 and 11 are summed, inverted and intergrated in circuit 12. The output of circuit 12 is then combined in adder 13 with the output of peak hold circuit 11. The output of adder 13 is then conducted to squarer 14, and through emitter-follower 15 to the Schmitt trigger 16. The waveforms in various parts of the circuit are shown adjacent the interconnecting lines.

Figure 2:
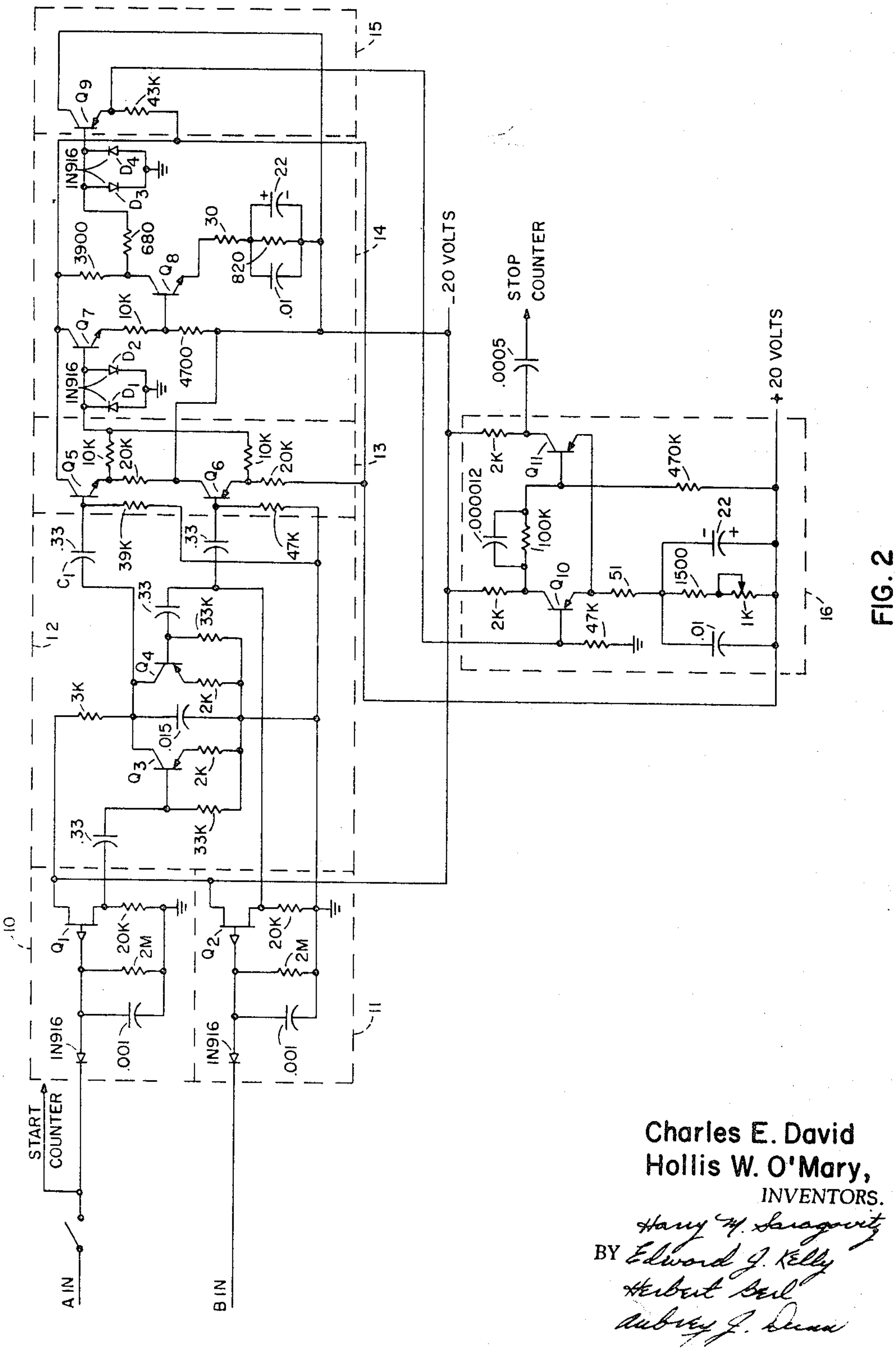
FIGURE 2 is a showing of a specific circuit embodiment of the invention.

FIGURE 2 shows a specific embodiment of the invention. The various circuits or "boxes" of FIGURE 1 are indicated by correspondingly numbered dotted line rectangles in FIGURE 2. The values of the various capacitors of FIGURE 2 are given in microfarads ($\mu$f.), and the resistance values are given in ohms, kilohms (K), or megohms (M). As can be seen from FIGURE 2, each of peak hold circuits 10 and 11 includes a field effect transistor, such as $Q_1$ in circuit 10, and each circuit additionally contains other circuit elements whose purpose will be explained below.

Taking circuit 10 as an example, the 1N916 diode passes only negative pulses from $A_{in}$ and also provides a high impedance for the peak hold circuit. This high impedance (in absence of an input) prevents a charge on the .001 $\mu$f. capacitor from discharging too rapidly. Incoming negative pulses have their peak values stored on the .001 $\mu$f. capacitor through the low impedance (in the input direction of the 1N916 diode. Such peak values of voltage are presented with high impedances by both the back impedance of the diode and the input of the field effect transistor $Q_1$, and dissipate mainly through the 2M resistor, whose value is determined by the desired hold time. The operation of circuit 11 is similar to the operation of 10.

The output of 10 is taken at the top of the 20K resistor in series with field effect transistor $Q_1$, and is fed through a .33 $\mu$f. capacitor to $Q_3$, which capacitor also provides D.C. blocking, and simplifies the biasing arrangement.

The current through transistor $Q_3$ is a function of the voltage output of $Q_1$ and the current through $Q_4$ is a function of the voltage output of $Q_2$, which is coupled through another .33 $\mu$f. capacitor from the junction between $Q_2$ and the 20K resistor connected thereto. In turn, the voltage across the 3K resistor connected to the collectors of $Q_3$ and $Q_4$ is related to the sum of the voltages from $Q_1$ and $Q_2$. However, the .015 $\mu$f. capacitor connected across transistors $Q_3$ and $Q_4$, together with the 3K resistor, comprise an integrating circuit so that the voltage output to $C_1$ is proportional to the integral of the sum of the voltages from $Q_1$ and $Q_2$. The $Q_3$–$Q_4$ circuit actually provides this integral in inverted form. The 2K resistors connected to the emitters of $Q_3$ and $Q_4$ are load resistors. The inverted integral is coupled through .33 $\mu$f. capacitor $C_1$ to transistor $Q_5$. Another output from $Q_2$ is coupled to $Q_6$ through another .33 $\mu$f. capacitor. Transistors $Q_5$ and $Q_6$ are each connected in an emitter follower configuration, and together form a summer for the inverted integral and the output of $Q_2$, through the summation of the voltages across the 20K emitter resistors. The39K and 47K resistors connected to the bases of transistors $Q_5$ and $Q_6$ provide biases therefor. The inverted integral voltage and the $Q_2$ output voltage summation is taken from the 10K resistors connected to the emitters of $Q_5$ and $Q_6$. This summation voltage is then passed to a clipping network composed of diodes $D_1$ and $D_2$, where any value of the summation voltage above or below predetermined values is clipped off. This clipped voltage is then fed into an amplifier including transistors $Q_7$ and $Q_8$, and their various biasing resistors, which amplifier provides the clipped voltage with steep slope zero crossings. The 10K resistor connected to the emitter of $Q_7$ and to the base of $Q_8$, together with the 4700 ohm resistor connected to the base of $Q_8$, form a biasing means for $Q_8$ and impedance match between $Q_7$ and $Q_8$. The resistor-capacitor combination in the emitter leg of transistor $Q_8$ provides the proper bias for $Q_8$. The 30 ohm resistor controls the gain of $Q_8$, the 820 ohm resistor provides the bias, and the .01 and 22 $\mu$f. capacitors act as high and low pass filters. The amplified output of $Q_8$ is fed to another clipping circuit composed of diodes $D_3$ and $D_4$, which clip the voltage in like manner to diodes $D_1$ and $D_2$. The clipped voltage from $D_3$–$D_4$ is then coupled to transistor $Q_9$, through the 680 ohm current limiting and bias resistor, which $Q_9$ is connected in an emitter follower configuration with a 43K emitter resistor, which emitter follower provides a proper impedance for the Schmitt trigger of box 16. Box 16 is a Schmitt trigger employing transistors $Q_{10}$ and $Q_{11}$ and their associated circuit elements. The operation of trigger 16 is well known and provides an output pulse when the input voltage thereto exceeds a predetermined level. An example of a Schmitt trigger similar to the instant trigger may be found in the book "Transistor Circuit Design," prepared by the Engineering Staff of Texas Instruments, Incorporated, and published in 1963 by the McGraw-Hill Book Company, page 381. The instant trigger differs from that shown in the cited book by employing a biasing network comprised of a 1500 ohm resistor in series with a variable 1K resistor, which resistors are paralleled by high and low pass capacitors .01 $\mu$f. and 22 $\mu$f., and by the provision of a .0005 $\mu$f. output capacitor.

All of the values for circuit components shown herein are exemplary, and are not intended to limit the invention. Obviously, other values of components may be substituted for those shown, for different delay times, etc., without departing from the spirit of the invention. Other diodes may be used from those shown, if proper voltage and current requirements are obtained.

While a specific embodiment of the invention has been disclosed, other embodiments may be obvious to one skilled in the art, in light of the present dsclosure.

We claim:

1. An interpolator circuit means for producing an output pulse in response to first and second input pulses, said interpolator circuit means comprising: a first peak hold circuit having a first input terminal and a first output terminal; a second peak hold circuit having a second input terminal and a second output terminal, said first input terminal being adapted to receive said first input pulse, said second input terminal being adaped to receive said second input pulse; summing-integrating means having third and fourth input terminals connected respectively to said first and second output terminals, said summing-integrating means having a third output terminal, said summing-integrating means summing and integrating said outputs from said first and second peak hold circuits at said first and second output terminal and providing a positive ramp voltage at said third output terminal; adder means having fifth and sixth input terminals and a fourth output terminal, with said fifth and sixth input terminals connected respectively to said third and second output terminals, said adder means adding said outputs from said third and second output terminals and providing a generally rising sawtooth voltage at its said fourth output terminal; squaring means having a seventh input terminal and a fifth output terminal, with said seventh input terminal connected to said fourth output terminal, said squaring means receiving said sawtooth voltage at its said seventh input terminal and producing a square wave at its said fifth output terminal; coupling means having an eighth input terminal connected to said fifth output terminal and with a sixth output terminal; and trigger means having a ninth input terminal and a seventh output terminal, with said ninth input terminal connected to said sixth output terminal, said trigger means providing an output pulse at said seventh output terminal when the input voltage at said ninth input terminal exceeds a predetermined level.

2. The interpolator of claim 1 in which each of said peak hold circuits includes a field effect transistor.

3. The interpolator of claim 1 in which said coupling means comprises an emitter follower circuit.

4. The interpolator of claim 1 in which the output of said summing-integrating means is inverted with respect to the two inputs.

5. The interpolator of claim 1 in which said summing-integrating means includes first and second transistor connected to a common load resistor and with a capacitor connected across said transistors.

6. The interpolator of claim 1 in which said squaring means includes first clipping means, amplifying means connected to said first clipping means, and second clipping means connected to the output of said amplifying means.

7. The interpolator of claim 6 in which said coupling means comprises an emitter follower.

8. The interpolator of claim 1 in which said trigger means is a Schmitt trigger.

References Cited

UNITED STATES PATENTS 3,043,516 7/1962 Abbot et al. -------- 235—195

MALCOLM A. MORRISON, *Primary Examiner.*

F. D. GRUBER, *Assistant Examiner.*

U.S. Cl. X.R.

307—235; 328—127, 117; 235—183, 196, 193